Sept. 19, 1950     J. JOHNSON     2,522,873
VEHICLE SEAT
Filed March 7, 1947

Inventor
JOHN JOHNSON

By Morrow, Berman & Davidson
Attorneys

Patented Sept. 19, 1950

2,522,873

UNITED STATES PATENT OFFICE 2,522,873

VEHICLE SEAT

John Johnson, Vashon, Wash.

Application March 7, 1947, Serial No. 733,094

1 Claim. (Cl. 155—51)

This invention relates to spring seats such as may be used on tractors, mowers, wagons and other farm equipment, and more particularly to means for reducing the side thrust and rigidity of such seat when the vehicle on which it is mounted travels over a rough surface.

It is well known that when a vehicle travels over an uneven or rough surface, considerable undesired side thrust will often develop in the seat irrespective of the usual resilient vertical suspension generally provided.

An object of this invention is, therefore, to provide a simple, inexpensive and efficient spring seat wherein side thrust is reduced to a minimum.

The above and still further objects of the invention will become apparent from the following description when taken in conjunction with the accompanying drawings, the invention being particularly pointed out in the appended claim.

Figure 1:
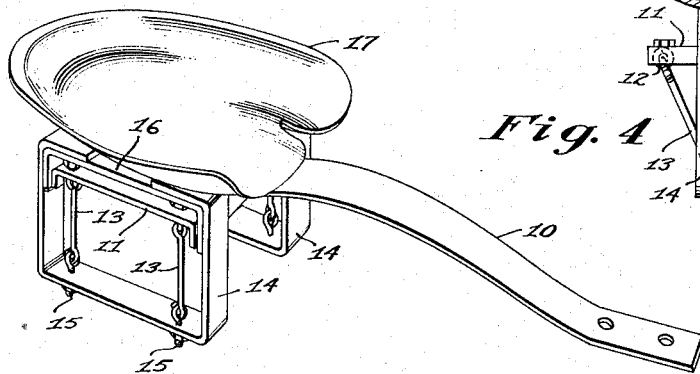
Figure 4:
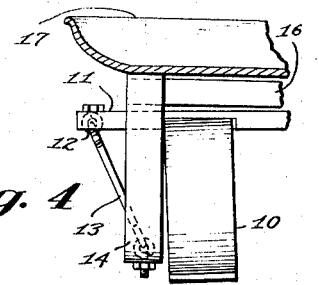
Figure 2:
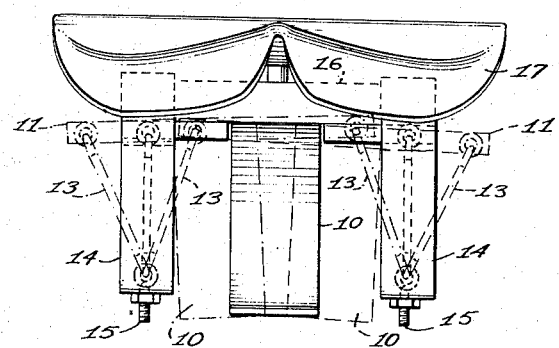
Figure 3:
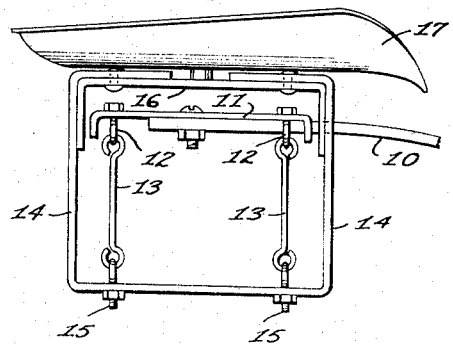

Reference is made to the drawings wherein like numerals of reference apply to the same parts throughout the several views, and wherein:

Figure 1 is a perspective side view of the complete seat and suspension or supporting members, Figure 2 is a front elevation in which the relative positions of the suspension members are indicated when side thrust in either direction occurs, Figure 3 is a side elevation, and Figure 4 is a front elevation showing the relative position of the seat and supporting members when side thrust in one direction occurs.

Referring to the figures in detail, a spring tongue 10, adapted for attachment at one end in any suitable manner to a vehicle, is bolted, riveted, welded or otherwise secured to a platform 11. Adjacent the corners of the platform are provided eye bolts 12 adapted to engage suspension links 13.

Two rectangular frame side members 14, suitably proportioned and spaced to permit freedom of vertical and horizontal motion of the spring tongue 10 and platform 11, are provided in their lower horizontal portions with eye bolts 15, in which the lower ends of suspension links 13 operate, and have their upper ends rigidly secured to a cross-member 16.

Frames 14 and cross-member 16 form a supporting frame to which the seat 17 may be rigidly secured in any suitable manner, as, for example, bolting or riveting.

It will be readily understood that whenever the vehicle on which the seat of this invention is utilized encounters a rough or other irregular surface, the tongue 10 may abruptly sway from side to side while the inertia of the seat and sitter will mitigate such thrust of the seat due to the type of suspension support used, and that the resiliency of the tongue will relieve the sitter of vertical shock.

It will also be understood that if suspension links 13 are so proportioned as to length that their lower ends describe arcs of similar radii when side thrust in tongue 10 occurs, the seat 17 will then maintain its normal angular position as assumed when tongue 10 is at rest.

It is to be understood that various modifications and changes may be made in this invention without departing from the spirit and scope thereof as set forth in the appended claim.

What is claimed is:

A seat device for attachment to a vertically-flexible spring tongue, comprising a pair of laterally-spaced vertical closed loop frames, said loop frames including vertically-spaced tops and bottoms connected together by front and rear ends, said loop frames being disposed on opposite sides of said spring tongue in spaced parallel relation thereto, a seat mounted on said tops of said loop frames and rigidly secured thereto to connect said frames together, a platform secured to said spring tongue below said seat transversely of said tongue and extending beyond opposite sides of said spring tongue to enter said vertical loop frames in subjacent relation to said tops thereof, said platform being forwardly and rearwardly spaced from said rear and front ends respectively of said frames, pairs of links arranged beneath opposite ends of said platform, means universally pivotally connecting upper and lower ends respectively of said links to corners of said platform and to said bottoms of said loop frames inwardly of said front and rear ends thereof, said links being substantially parallel and being normally housed within said loop frames when said seat is in a normal position, said spring tongue being arranged to contact with at least the front ends of said loop frames to limit lateral swinging movement of such loop frames relative to said spring tongue, and said platform being engageable with said front and rear ends of said loop frames to limit relative swinging movement of said seat longitudinally of said spring tongue whereby to permit limited swinging movement of said seat relative to said spring tongue in all directions.

JOHN JOHNSON.

REFERENCES CITED

The following references are of record in the file of this patent:

UNITED STATES PATENTS

| Number | Name | Date |
|---|---|---|
| D. 149,900 | Mock | June 8, 1948 |
| 418,677 | Benish | Jan. 7, 1870 |
| 2,409,714 | Silkan | Oct. 22, 1946 |